March 11, 1930.  A. C. MASON  1,749,829
CLOTH SHEARING MACHINE
Filed May 20, 1929
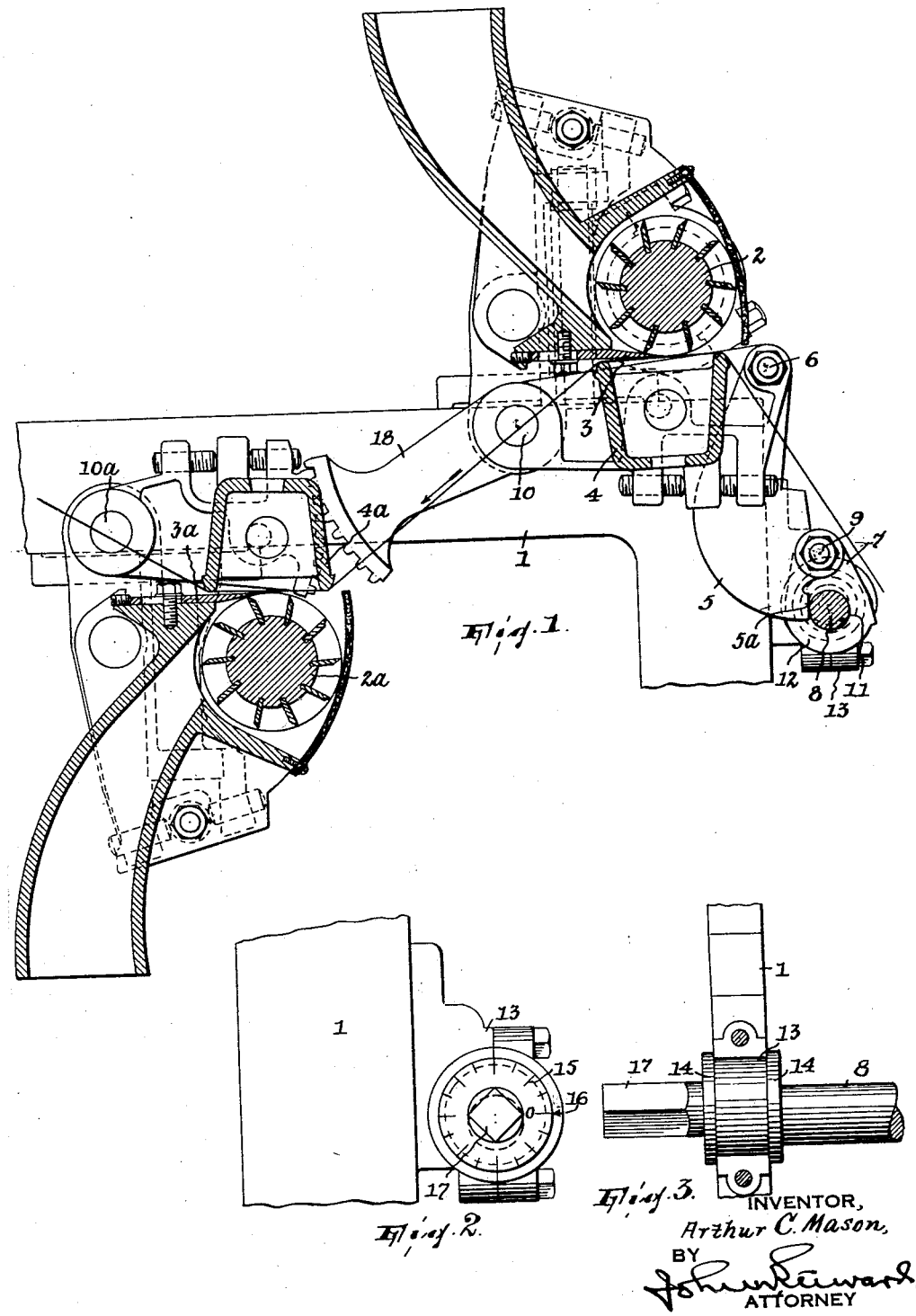
INVENTOR,
Arthur C. Mason,
BY
ATTORNEY Patented Mar. 11, 1930

1,749,829

UNITED STATES PATENT OFFICE

ARTHUR C. MASON, OF HAWTHORNE, NEW JERSEY

CLOTH-SHEARING MACHINE

Application filed May 20, 1929. Serial No. 364,511.

This invention relates to machines for shearing the face of a moving cloth.

One object of the invention is to provide a cloth shearing machine of this class with means whereby the operator can effect adjustment one toward or from the other of the coactive cloth-shearing and guiding means, thus to vary the depth of the shearing operation. Another object is to provide in a simple way not only for such adjustment but for that movability of one of said means from and toward the other which is resorted to in these machines to permit a seam or other irregularity in the cloth to pass the shearing line without undergoing shearing.

In the drawing,

Fig. 1 is a longitudinal sectional view of sufficient of a cloth shearing machine embodying the invention to illustrate the latter; and Figs. 2 and 3 are, respectively, side and front elevations of the elements which function in effecting the adjustment.

1 designates the frame or supporting means. The shearing means is formed by the rotary cutter 2, suitably journaled in the frame, and the ledger blade 3 coactive with the cutter and fixed in the frame.

The cloth-guiding means is here afforded by the following system of parts, to wit: The cloth-rest 4, which is as usual channeled or U-shaped in transverse section and extends across the machine parallel with cutter 2 and blade 3; a pair of links 5 pivoted to the cloth-rest at 6; and a pair of arms 7 fixed on the shaft 8 and to which the links are pivoted at 9. (Only one link and one arm are shown, it being understood that the section of Fig. 1 is taken between the members of each pair of links and arms).

This system is supported in the frame in part by the cloth-rest having a pivot at 10 in the frame and in part as follows: Each end of the shaft is journaled in an eccentric bearing hole 11 in a rotatively adjustable bushing 12 arranged in a bearing 13 on the frame and having exterior end flanges 14 at both sides of the bearing confining it from endwise movement therein. The bushing has a dial 15 any one of whose indices may be brought into registry with a fixed index or pointer 16 on the bearing upon turning the bushing, as with a wrench, by means of its extension or stub 17.

When the depth of the shearing operation is to be changed the operator turns the two bushings, thus elevating or depressing their eccentric holes 11 and consequently the shaft and the aforesaid system, of which it forms a part. In the drawing both said holes and therefore said system are fully depressed. This may be indicated to the operator, as shown, by a zero mark on the dial being then opposite the pointer.

Each arm and the corresponding link in the present example together form a toggle connection between the cloth-rest and the support therefor on the frame afforded by the bushing, and it is when this toggle connection is in the condition shown by Fig. 1, when the pivot 9 has been made to move clockwise a little past a straight line connecting the axes of pivot 6 and shaft 8 and a toe or stop $5^a$ on the link bears against the shaft, as shown, that the cloth-rest is in operative relation to the shearing means, for shearing.

When the cloth-rest is to be depressed into inoperative relation to the shearing means for shearing, as when a seam is to pass, the toggle connection is buckled by turning element 7—8 anti-clockwise until pivot 9 passes the straight line connecting 6 and 8, whereupon the cloth-rest will fall to its inoperative position under the action of gravity at all times operative thereon. Whether this is done manually or automatically is here not material.

In the example there are shown parts $2^a$, $3^a$ and $4^a$ respectively corresponding to parts 2, 3 and 4 and operative in the well-known way to shear the opposite face of the cloth, and the structure $4^a$, pivoted at $10^a$, is geared at 18 to an arm of cloth-rest 4 so that it will approach and recede from its shearing means in consonance with the structure 4 and so that the two structures almost counter-balance each other.

Having thus fully described my invention, what I claim is:

1. The combination of supporting means, coactive cloth-shearing and cloth-guiding instrumentalities therein, one of said instrumentalities being adjustable toward and from the other, an adjusting member for said one of said instrumentalities arranged in said means, and a toggle connection connecting said member and the movable one of said instrumentalities.

2. The combination of supporting means, coactive cloth-shearing and cloth-guiding instrumentalities therein, one of said instrumentalities being adjustable toward and from the other, an eccentric adjusting member for said one of said instrumentalities, and a toggle connection connecting said member and the movable one of said instrumentalities.

3. The combination of the frame, one of the coactive cloth-shearing and cloth-guiding means arranged therein, a collapsible system including the other of said coactive means and adjustable in the frame toward and from the first means, and an adjusting member for said system supporting the same and arranged in the frame.

In testimony whereof I affix my signature.

ARTHUR C. MASON.